United States Patent [19]
Chun

[11] Patent Number: 5,568,754
[45] Date of Patent: Oct. 29, 1996

[54] SERVO CONTROLLED RIGHT ANGLE SHEAR PRESS

[75] Inventor: Victor L. Chun, Charlotte, N.C.

[73] Assignee: Murata Machinery, Ltd., Japan

[21] Appl. No.: 4,759

[22] Filed: Jan. 14, 1993

[51] Int. Cl.⁶ .................................................. B26D 5/12
[52] U.S. Cl. ........................ 83/13; 83/620; 83/639.1
[58] Field of Search ............................ 83/13, 39, 49, 83/52, 620, 916, 639.1

[56] References Cited

U.S. PATENT DOCUMENTS

| | | |
|---|---|---|
| 3,942,400 | 3/1976 | Roch . |
| 4,481,847 | 11/1984 | Schneider et al. ............... 83/916 |
| 4,534,255 | 8/1985 | Salvagnini ........................ 83/620 |
| 4,738,173 | 4/1988 | Kiuchi ............................. 83/49 |
| 4,771,663 | 9/1988 | Naito et al. ...................... 83/49 |

Primary Examiner—Rinaldi I. Rada
Attorney, Agent, or Firm—John R. Benefiel

[57] ABSTRACT

A right angle shear press in which the upper blades are able to be positioned at a partially retracted park position and moved to a partially extended position to match the size of the shear cuts to a reduced stroke. A servocontroller and position sensor is used to control the stroke of a hydraulic actuator with a CNC controller allowing program controlled shear positioning and stroking.

2 Claims, 3 Drawing Sheets

SERVO CONTROLLED RIGHT ANGLE SHEAR PRESS

BACKGROUND OF THE INVENTION

This invention concerns right angle shear presses, sometimes also referred to as corner shear presses.

In a right angle shear, two shear blades are mounted to a holder to extend at right angles to each other, operated with a single actuator such as a hydraulic cylinder.

The shear blade holder is caused to move vertically by operation of the actuator and cause the shear blades to progressively cut a sheet material workpiece along a first or X axis shear blade until contact of the workpiece with a second or Y axis of the shear blades is reached. Thereafter, cutting along the Y axis occurs progressively with further descent of the holder.

The actuator undergoes a complete stroke through a range of motion of the actuator for each cycle of operation of the shear press.

In order to be more flexible, right angle shear presses with back-to-back actuators have been devised in which a short stroke actuator is combined with the main actuator. The short stroke actuator is used to cause only a partial descent of the X axis blade from its fully retracted position, such that the corner formed by the two shear blades does not reach the workpiece. See the corner shear press described in U.S. Pat. No. 3,942,400 as an example. This arrangement enables continuous cutting along the X axis to improve the flexibility in use of the press.

The control of the actuator so as to undergo a full stroke in each press cycle leads to inefficiencies when relatively short dimensioned workpieces are to be produced, as actual cutting takes place for only a fraction of the stroke. Thus, the time and energy required for unneeded segments of the actuation is wasted.

SUMMARY OF THE INVENTION

The present invention comprises a servo control of an actuator so as to enable a controllably located "park" or partially descended positioning of the blade holder and shear blades relative to lower fixed shear blades. A controllably located end position is also enabled by the servo control, foreshortening the stroke in the extended direction so as to allow a variable length cutting stroke along each of the X and Y axes. Thus, the actuator stroke can be tailored to the dimensions of the workpiece to be cut, greatly increasing the efficiency of the operation of the press.

By utilizing a servo control, the thickness of the material is factored into the setting of the park and end point locations, with the press workpiece gripper carriage moving the sheet to the proper location with respect to the initial cutting point at the particular park location.

Additionally, the pressure of the actuating fluid can be controlled to be matched to the material thickness and characteristic as a still further improvement.

Feedback of load sensor signals may also allow adaptation of the cutting parameters to actual conditions, accommodating dulling of the blade and other variables.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it to be understood that the same is not intended to be limiting and should not be so construed inasmuch as the invention is capable of taking many forms and variations within the scope of the appended claims.

Figure 1:
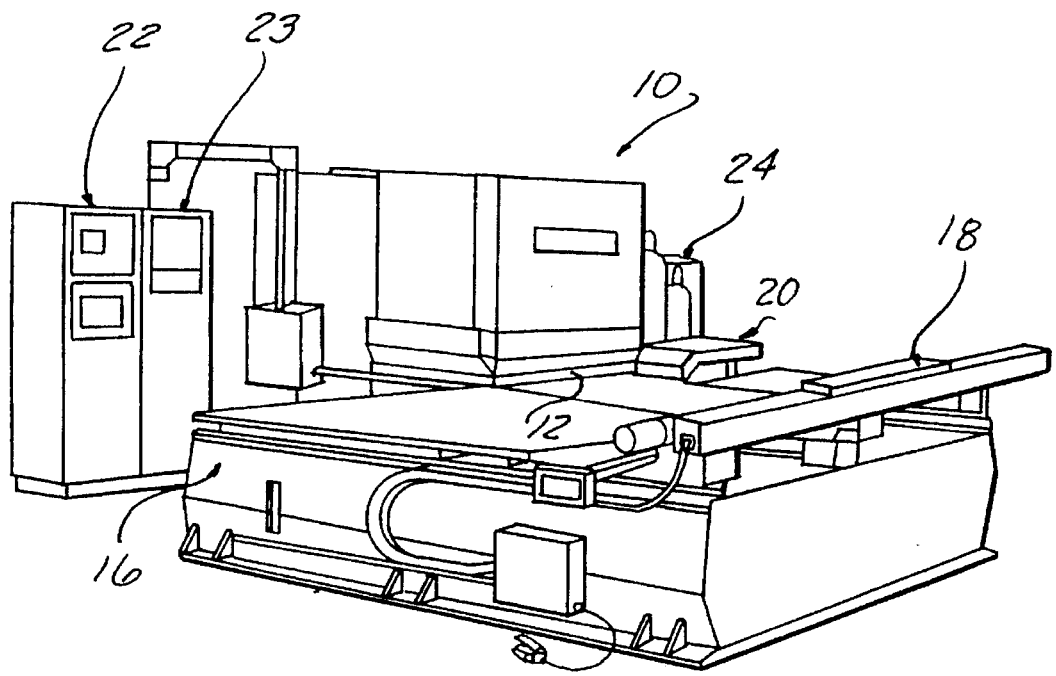
FIG. 1 is a perspective view of a right angle shear press and associated equipment, in which the actuator servo control according to the invention is incorporated.

Referring to the Drawings, and particularly FIG. 1, a right angle shear press 10 is shown having X and Y upper shear blades 12, 14. A table 16 supports a piece of sheet material which is driven by means of a well known powered gripper carriage 18 so as to position the sheet material in a programmed location for execution of programmed shear cuts.

An output conveyor 20 may be employed to collect cut pieces after being sheared from the sheet material.

Electrical panels 22, 23 house the CNC and machine operation controls respectively.

The actuator is contemplated by the present invention as being hydraulically operated, as will be described, and hence a hydraulic power unit 24 is here included providing a source pressurized hydraulic fluid.

Figure 2:
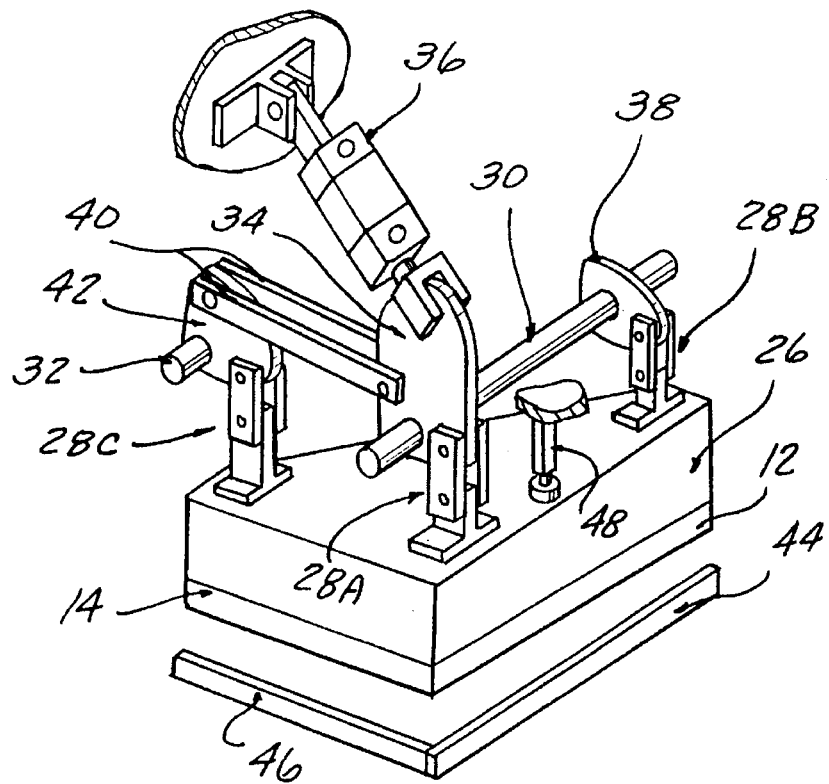
FIG. 2 is a perspective view of the actuator shear blades and holder components of the shear press shown in FIG. 1.

The major shear blade components are shown in FIG. 2 in simplified form.

The X and Y axis upper shear blades 12, 14 are affixed to a holder plate 26, extending at right angles to each other and fixed at one end to form a corner in the well known manner.

The holder plate 26 is supported for guided vertical movement by means of a series of linkages 28A, 28B, and 28C.

A pair of crankshafts 30, 32 are provided, a primary crank arm 34 affixed to crankshaft 30 and oscillated by a single hydraulic actuator 36 and connected to linkage 28A.

A secondary crank arm 38 is fixed at the other end of the crankshaft 30, pinned to the linkage 28B.

A pair of connecting arms 40 are each also pinned at one end to crank arm 34 and at the other end to a crank arm 42 affixed to crank shaft 32.

Crank arm 42 is pinned to linkage 28C. Thus, as actuator 36 is stroked, oscillation of crankshaft 30 causes corresponding oscillation of crankshaft 32, and guided vertical motion of the holder plate 26 to bring the X and Y axis shear blades 12, 14 towards and away from fixed lower shear blades 44, 46 fixed to the machine frame.

A positional feedback sensor 48 such as an LVDT transducer provides a means for generating electrical signals corresponding to the vertical position of the upper shear blades 12, 14 for use in the servo control of the actuator 36.

Figure 3:
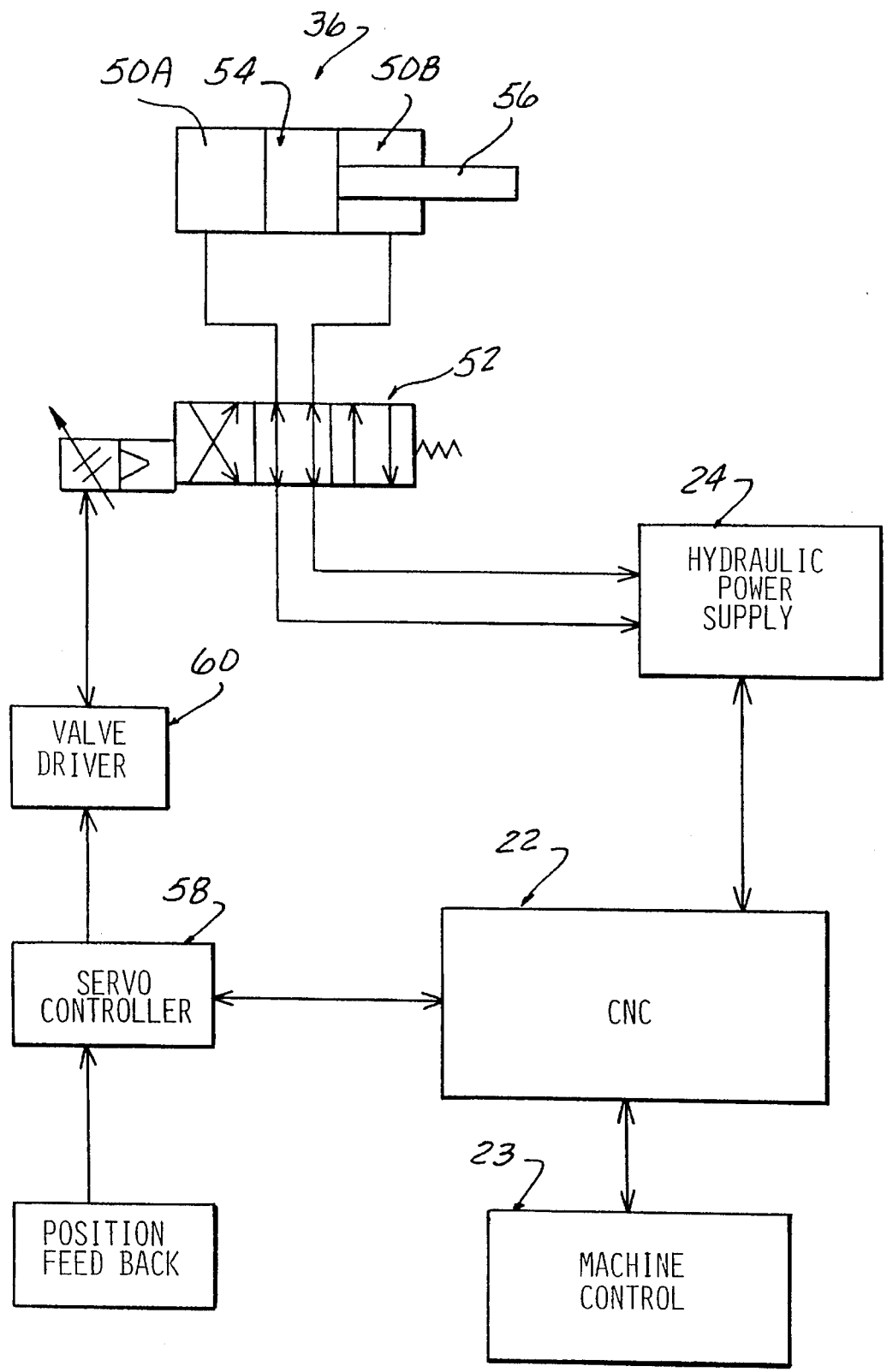
FIG. 3 is a block diagram representation of the actuator servo control according to the present invention.
Figure 4:
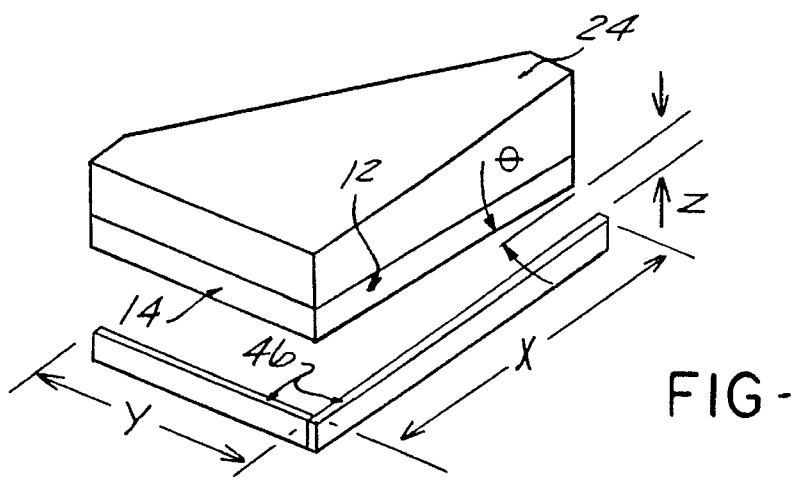
FIG. 4 is a diagrammatic representation of the upper and lower shear blades marked with geometrical parameters.
Figure 5:
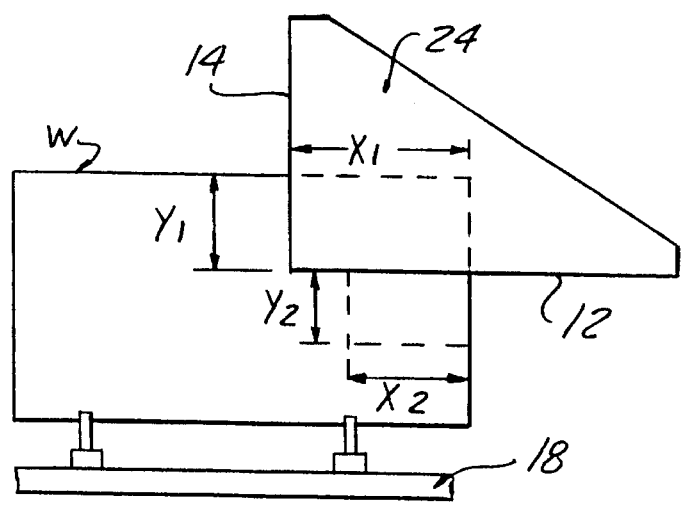
FIG. 5 is a plan diagrammatic view of a workpiece and shear blades, marked with geometric parameters, indicating two part pieces $X_1$ by $Y_1$, and $X_2$ by $Y_2$ to be cut.
Figure 6:
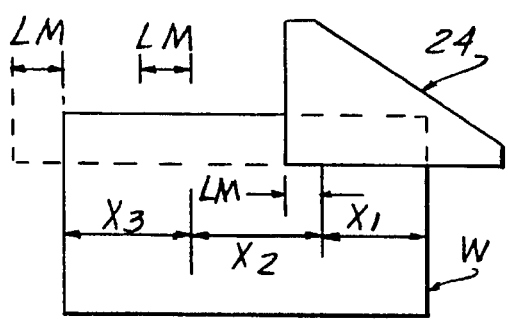
FIG. 6 is plan diagrammatic view of a workpiece and shear blades with successive X axis cuts $X_1$, $X_2$, $X_3$ to be made.
Figure 7:
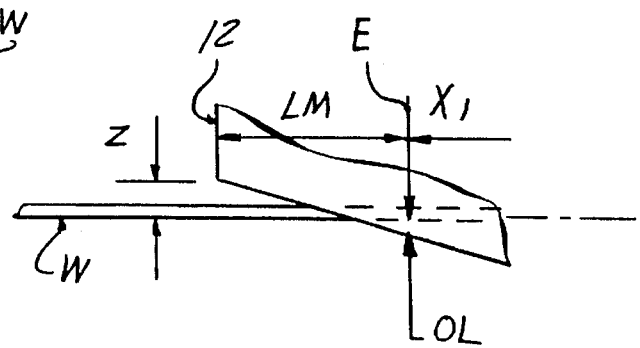
FIG. 7 is an elevational diagram through a workpiece and X axis shear blade.

FIG. 3 depicts the servo control in block diagram form.

The hydraulic actuator 36 comprises a double acting hydraulic cylinder, with chambers 50A, 50B alternatively pressurized or depressurized by means of a servovalve 52 controlling communication with the source of hydraulic pressure so as to drive the piston 54 and piston rod 56 in either direction to raise or lower the blade holder 26.

The servo valve 52 is controlled by a servo controller 58 and valve driver 60.

The servo controller 58 receives control signals from the CNC controller 22 and position feedback sensor 48 so as to position the blade holder plate 26 in a programmed position, both at the beginning and end of a press shearing cycle.

According to the concept of the present invention, the shear holder plate 26 is positioned in a "park" position, partially descended, depending on the length of cut along the X axis and the material thickness, so that a reduced stroke length is used for pieces to be cut of smaller sizes less than the full size able to be cut with a complete stroke length, or for X lengths in which a series of lesser cuts are relied on to produce a longer length cut along the X axis.

Furthermore, the full extent of descent is not undergone where less than a full Y axis cut is required for the particular Y dimension of the piece to be cut.

Thus, the stroke length is shortened at both ends to greatly reduce the required cycle time.

The various parameters are indicated in FIGS. 4–7, and the following relationships exist:

$Z_0$=vertical distance from lower blade when upper blade is fully retracted

S=upper blade stroke
   =$Z_0$+Lx tan+Ly tan+OL $Z_i$=intermediate parking position of upper blade
   i=1, 2, 3, . . .

$S_i$=intermediate stroke length
   i=1, 2, 3, . . .

Lx=Blade length in "x"

Ly=Blade length in "y"

$\phi$=Blade inclination angle

OL=Blade overlap at point "E"
   Point "E" is the end of the theoretical full thickness cut Park position for next cut to produce part x, by y,
   $Z_1=Z_0-(Lx-X_1)$ Tan $\phi$ Stroke from parked position
   $S_1=X_1$ Tan $\phi+Y_1$ Tan $\phi+Z_0$+OL Stroke return to park for next part $X_2$ by $Y_2$
   Tan $\phi+Y_1$ Tan $\phi+Z_0$+OL or, park position for next part $X_2$ by $Y_2$
   $Z_2=Z_0-(Lx-X_2)$ Tan $\phi$ LM=margin from corner $$Lm = \frac{\tau_0 + OL}{\text{Tan }\emptyset}$$

Xi=Length of cut
   i=1, 2, 3, . . .

Zi=park position from lower blade at beginning Xi cut
   i=1, 2, 3, . . .

Zi=$Z_0$–(Lx–LM–Xi) Tan $\phi$
   =$Z_0$+OL+the thickness of the material–(Lx–Xi) Tan $\phi$ Si=Stroke length in vertical direction
   =Xi Tan $\phi$+$Z_0$+OL+the thickness of the material
   i=1, 2, 3, . . . .

The gripper carriage is driven to position the workpiece W at the appropriate horizontal location so as to initiate shearing at the start point depending on where the park position of the upper shear blade 12 is set, and the end point of the Y cutting stroke is set.

The use of a separate servo valve control allows the system pressure to be set at a level corresponding to the particular requirements of a given shear program to obtain further improvements in efficiency. Shearing velocities may also be increased, or reduced as required to keep noise below a maximum acceptable level while keeping cycle times at a minimum.

By use of a load sensor, adjustments can be made to reflect actual loads encountered as when material shear characteristics vary or where blade dulling occurs.

Finally, the effect on the press performance of cold start ups is minimal, as the programmed velocities, are controlled by the servo controller as necessary.

I claim:

1. A method of shearing a sheet material workpiece into individual rectangular pieces of varying size using a right angle shear having upper shear blades able to be vertically cyclically moved by an actuator from a fully retracted to a fully extended position of said actuator, said method including the step of cycling said actuator to move said upper shear blades from an initial partially retracted park position to a partially extended position and back to said partially retracted park position for pieces not requiring said full stroke of said upper shear blades from said fully retracted to said fully extended position to cut out said pieces.

2. The method according to claim 1 further including the step of varying said park position of said upper blades depending in part on the thickness of said workpiece to begin cutting upon movement of said shear blades from said park position.

\* \* \* \* \*